United States Patent
Huang et al.

(10) Patent No.: US 10,090,744 B2
(45) Date of Patent: Oct. 2, 2018

(54) VIBRATION MOTOR

(71) Applicants: Xingzhi Huang, Shenzhen (CN); Hongxing Wang, Shenzhen (CN); Rongguan Zhou, Shenzhen (CN)

(72) Inventors: Xingzhi Huang, Shenzhen (CN); Hongxing Wang, Shenzhen (CN); Rongguan Zhou, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 341 days.

(21) Appl. No.: 15/010,850

(22) Filed: Jan. 29, 2016

(65) Prior Publication Data
US 2017/0012517 A1    Jan. 12, 2017

(30) Foreign Application Priority Data
Jul. 8, 2015   (CN) .................... 2015 2 0488848 U

(51) Int. Cl.
*H02K 33/00*   (2006.01)
*H02K 33/16*   (2006.01)
*H02K 33/18*   (2006.01)

(52) U.S. Cl.
CPC ............. *H02K 33/00* (2013.01); *H02K 33/16* (2013.01); *H02K 33/18* (2013.01)

(58) Field of Classification Search
CPC ......... H02K 33/00; H02K 33/16; H02K 33/18
USPC .............................................. 310/25; 181/163
See application file for complete search history.

(56) References Cited

U.S. PATENT DOCUMENTS

| | | | | |
|---|---|---|---|---|
| 8,224,016 B2* | 7/2012 | Song | ........................ | H04R 1/24 181/163 |
| 8,235,167 B2* | 8/2012 | Kobayashi | ............... | H04R 7/16 181/163 |
| 8,878,401 B2* | 11/2014 | Lee | ........................ | H02K 33/16 310/15 |
| 9,871,432 B2* | 1/2018 | Mao | ........................ | H02K 33/16 |
| 2012/0104875 A1* | 5/2012 | Park | ........................ | H02K 33/16 310/25 |
| 2012/0169151 A1* | 7/2012 | Dong | ........................ | H02K 33/16 310/25 |
| 2016/0226363 A1* | 8/2016 | Mao | ........................ | H02K 33/16 |
| 2017/0117793 A1* | 4/2017 | Mao | ........................ | H02K 33/16 |

* cited by examiner

*Primary Examiner* — Forrest M Phillips
(74) *Attorney, Agent, or Firm* — IPro, PLLC; Na Xu

(57) ABSTRACT

A vibration motor is provided in the present disclosure. The vibration motor includes a housing providing an accommodating space, and a first vibration system and a second vibration system elastically suspended within the accommodating space. The first vibration system includes at least one permanent magnet, and the second vibration system includes at least one magnetic force generation part opposite to the permanent magnet. A magnetic field generated by the magnetic force generation part interacts with the permanent magnet to drive the first vibration system and the second vibration system to vibrate in the housing.

15 Claims, 3 Drawing Sheets

VIBRATION MOTOR

FIELD OF THE DISCLOSURE

The present disclosure relates to vibration motor technologies, and more particularly, to a vibration motor applicable to a mobile device.

BACKGROUND

With the development of the electronic technology, mobile devices, such as mobile phones, handheld game players, navigation devices, handheld multimedia entertainment devices, or the like, become more and more popular. Generally, the mobile devices use vibrating motors for generating vibration feedback, for example, the vibrating motor may be used in a mobile phone for providing system vibrating feedback while receiving an incoming call or receiving a message.

A typical vibration motor applied to the mobile device includes a shell and a vibration system accommodated in the shell. The vibration system can only provide a single resonant frequency; however, some of the mobile devices may require vibrating motors therein to provide more than one resonant frequency, for example, two resonant frequencies. In this situation, the mobile device requires two independent vibration motors to be included therein. The two vibration motors need to occupy unduly large space in the mobile device, which is adverse to miniaturization of the mobile device.

Accordingly, it is necessary to provide a new vibration motor to overcome the aforesaid drawbacks.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be further described with reference to the attached drawings and embodiments hereinafter.

Figure 1:
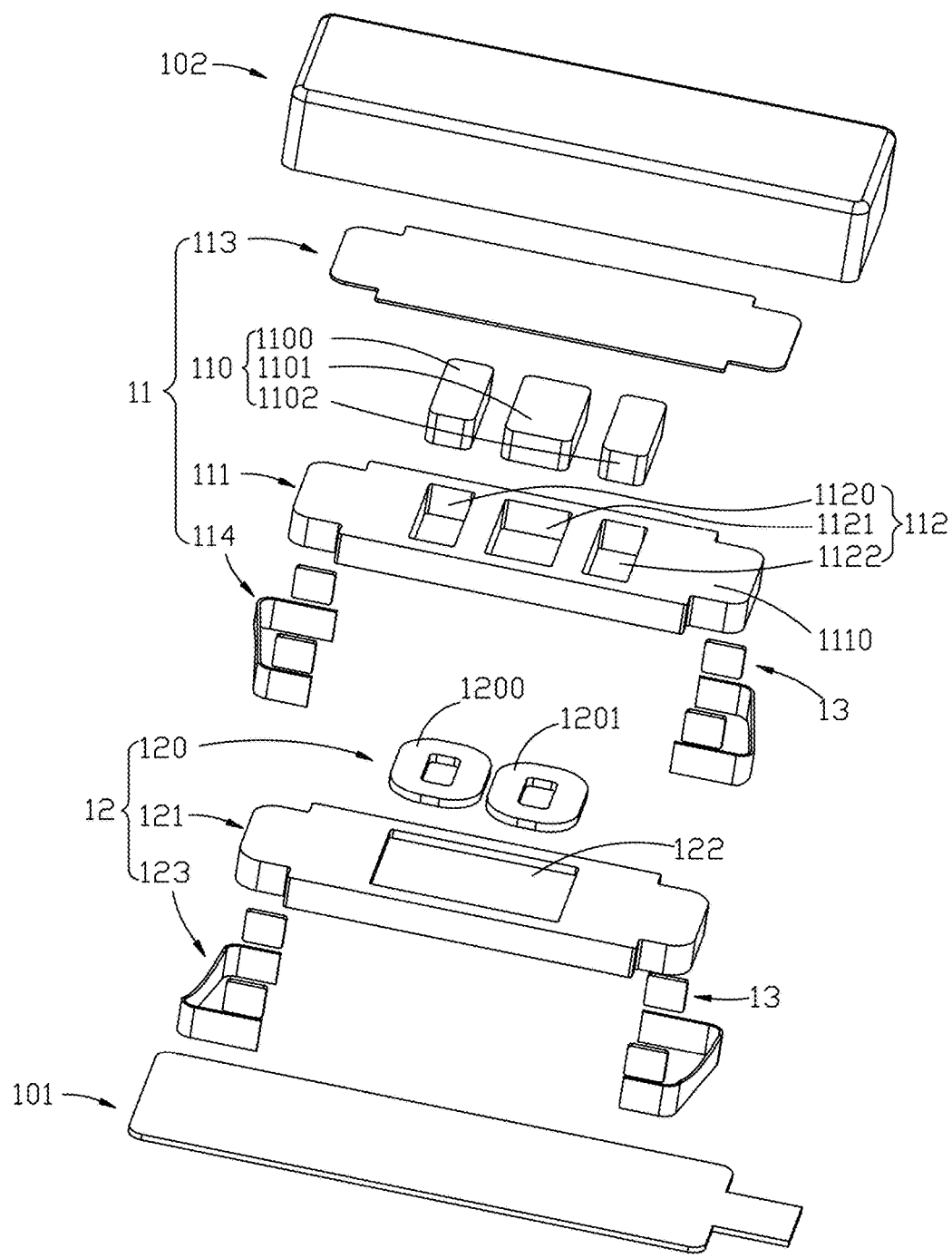
FIG. 1 is an exploded view of a vibration motor according to an embodiment of the present disclosure.
Figure 2:
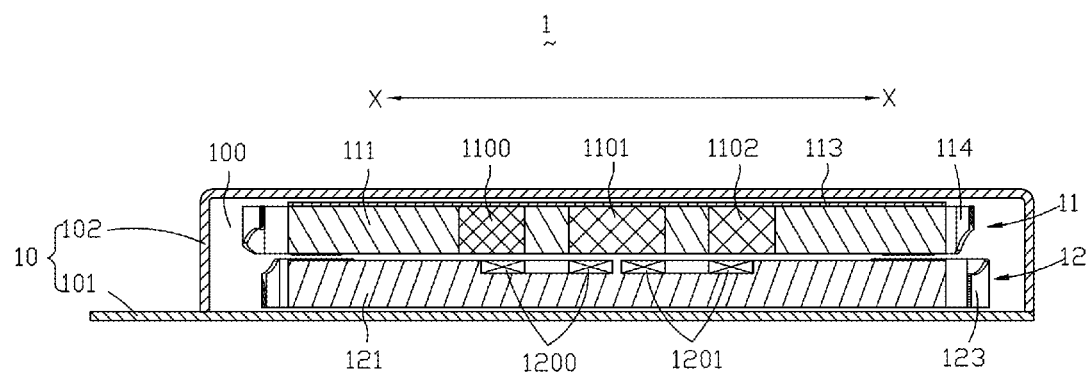
FIG. 2 is an assembled, cross-sectional view of the vibration motor of FIG. 1.

Referring to FIG. 1 and FIG. 2, a vibration motor 1 according to an embodiment of the present disclosure is shown. The vibration motor 1 includes a housing 10, a first vibration system 11 and a second vibration system 12. The housing 10 provides an accommodating space 100 for accommodating the vibration system 11 and the second vibration system 12.

The first vibration system 11 includes at least one permanent magnet 110, and the second vibration system 12 includes at least one magnetic force generation part 120. The magnetic force generation part 120 is opposite to and spaced apart from the permanent magnet 110. The magnetic force generation part 120 is configured for generating a magnetic field, which interacts with the permanent magnet 110, to drive the first vibration system 11 and the second vibration system 12 to vibrate in the housing 10.

For example, both of the first vibration system 11 and the second vibration system 12 may be elastically suspended within the accommodating space 100 of the housing 10, and the magnetic field generated by the magnetic force generation part 120 of the second vibration system 12 interacts with the permanent magnet 110 of the first vibration system 11 to generate a driving force, e.g., an attractive force or a repulsive force, the driving force further drives the first vibration system 11 and the second vibration system 12 to vibrate in a horizontal direction in the housing 10.

In the present disclosure, the magnetic force generation part 120 is not fixed in the housing 10; instead, the magnetic force generation part 120 is elastically suspended in the housing 10. As such, the first vibration system 11 and the second vibration system 12 within the vibration motor 1 can cooperate with each other and provide two different resonant frequencies.

The first vibration system 11 may have a first intrinsic resonant frequency, and the second vibration system 12 may have a second intrinsic resonant frequency. When the first intrinsic resonant frequency and the second intrinsic resonant frequency are equal to one another, both the first vibration system 11 and the second vibration system 12, if vibrate in a same vibration direction, can obtain a maximum vibration amplitude. However, when vibration directions of the first vibration system 11 and the second vibration system 12 are opposite to each other, the vibrations of the first vibration system 11 and the second vibration system 12 would be counteracted by each other; in this circumstance, the vibration motor 1 can provide weak vibration or even no vibration. Therefore, the first intrinsic resonant frequency and the second intrinsic resonant frequency are preferred to be different in the present disclosure, in order that the vibration motor 1 can provide two different resonant frequencies to avoid vibration counteraction.

Because the magnetic force generation part 120 and the permanent magnet 110 respectively provide action force and reaction force to each other, a vibration direction of the first vibration system 11 is always opposite to that of the second vibration system 12. Thus, an overall vibration intensity of the vibration motor 1 is slightly smaller than a vibration intensity of any of the first vibration system 11 and the second vibration system 12. However, when the vibration motor 1 receives a driving signal with a frequency substantially equal to the first intrinsic resonant frequency of the first vibration system 11 or the second intrinsic resonant frequency of the second vibration system 12, the vibration motor 1 can provide strongest vibration with a greatest intensity. As can be seen, the vibration motor 1 as provided in the present disclosure can provide strong vibration at two different frequency points, and thus is applicable to more scenarios.

When the vibration motor 1 receives a driving signal with a frequency substantially equal to the first intrinsic resonant frequency of the first vibration system 11, the first vibration system 11 can obtain a first maximum vibration amplitude; similarly, when the vibration motor 1 receives a driving signal with a frequency substantially equal to the second intrinsic resonant frequency of the second vibration system 12, the second vibration system 12 can obtain a second maximum vibration amplitude. Upon a condition that the first intrinsic resonant frequency is different from the second intrinsic resonant frequency, when the frequency of the driving signal is equal to the second intrinsic resonant frequency, the first vibration system 11 is almost in a stationary state; in contrast, when the frequency of the driving signal is equal to the first intrinsic resonant frequency, the second vibration system 12 is almost in a stationary state. Thus, the vibration motor 1 as provided in the present disclosure can obtain a vibration function which is equivalent to two vibration motors with different resonant frequencies is integrated therein, by sharing only one permanent magnet and one magnetic force generation part for two vibration systems. Accordingly, a space occupied by the vibration motor 1 can be reduced.

As illustrated in FIG. 1 and FIG. 2, in the present embodiment, the first vibration system 11 further includes a first mass block 111. The first mass block 111 includes a plurality of parallel receiving holes 112 for receiving the permanent magnet 110. The permanent magnet 110 includes a first permanent magnet unit 1100, a second permanent magnet unit 1101 and a third permanent magnet unit 1102; the receiving holes 112 includes a first receiving hole 1120 for receiving the first permanent magnet unit 1100, a second receiving hole 1121 for receiving the second permanent magnet unit 1101, and a third receiving hole 1122 for receiving the third permanent magnet unit 1102, respectively. The first receiving hole 1120, the second receiving hole 1121 and the third receiving hole 1122 are arranged in parallel along a vibration direction X-X of the first vibration system 11, and are spaced apart from each other.

The first mass block 111 further includes an upper surface 1110 that is away from the second vibration system 12, and the first vibration system 11 further includes a magnetic plate 113 attached to the upper surface 110 of the mass block 111. The magnetic plate 113 covers the first permanent magnet unit 1100, the second permanent magnet unit 1101 and the third permanent magnet unit 1102.

The second vibration system 12 further includes a second mass block 121. An accommodating groove 122 is formed in the second mass block 121 for accommodating the magnetic force generation part 120. The accommodating groove 122 is recessed perpendicular to the vibration direction X-X of the first vibration system 11.

The magnetic force generation part 120 may be a coil assembly including a first coil 1200 and a second coil 1201 received in the accommodating groove 122 in parallel. The first coil 1200 is placed under the first permanent magnet unit 1100 and a first portion of the second permanent magnet unit 1101, and the second coil 1201 is placed under a second portion of the second permanent magnet unit 1101 and the third permanent magnet unit 1102. The first coil 1200 and the second coil 1201 are disposed within the same accommodating groove 122 without being superposed by each other. In the present embodiment, preferably, the first coil 1200 and the second coil 1201 are both flat ring-shaped coils, and after being energized, the first coil 1200 and the second coil 1201 generate magnetic fields to interact with the first permanent magnet unit 1100, the second permanent magnet unit 1101 and the third permanent magnet unit 1102.

The first vibration system 11 further includes a pair of first elastic connectors 114 for elastically connecting two opposite ends of the first mass block 111 with the housing 10, each of the first elastic connectors 114 has a first end connected to the housing 10, and a second end connected to a corresponding end of the first mass block 111. The second vibration system 12 further includes a pair of second elastic connectors 123 for elastically connected two opposite ends of the second mass block 121 with the housing 10, each of the second elastic connectors 123 has a first end connected to the housing 10 and a second end connected to a corresponding end of the second mass block 121.

The first elastic connectors 114 and the second elastic connectors 123 are both U-shaped elastic connecting members in the present embodiment. In practice, the first elastic connectors 114 and the second elastic connectors 123 are not limited to above-mentioned configuration, and may alternatively be V-shaped elastic connecting members, spiral springs, or other elements capable of elastically suspending the first vibration system 11 and the second vibration system 12 within the accommodating space 100 of the housing 10, and proving resilient restoring force to the first vibration system 11 and the second vibration system 12.

Figure 3:
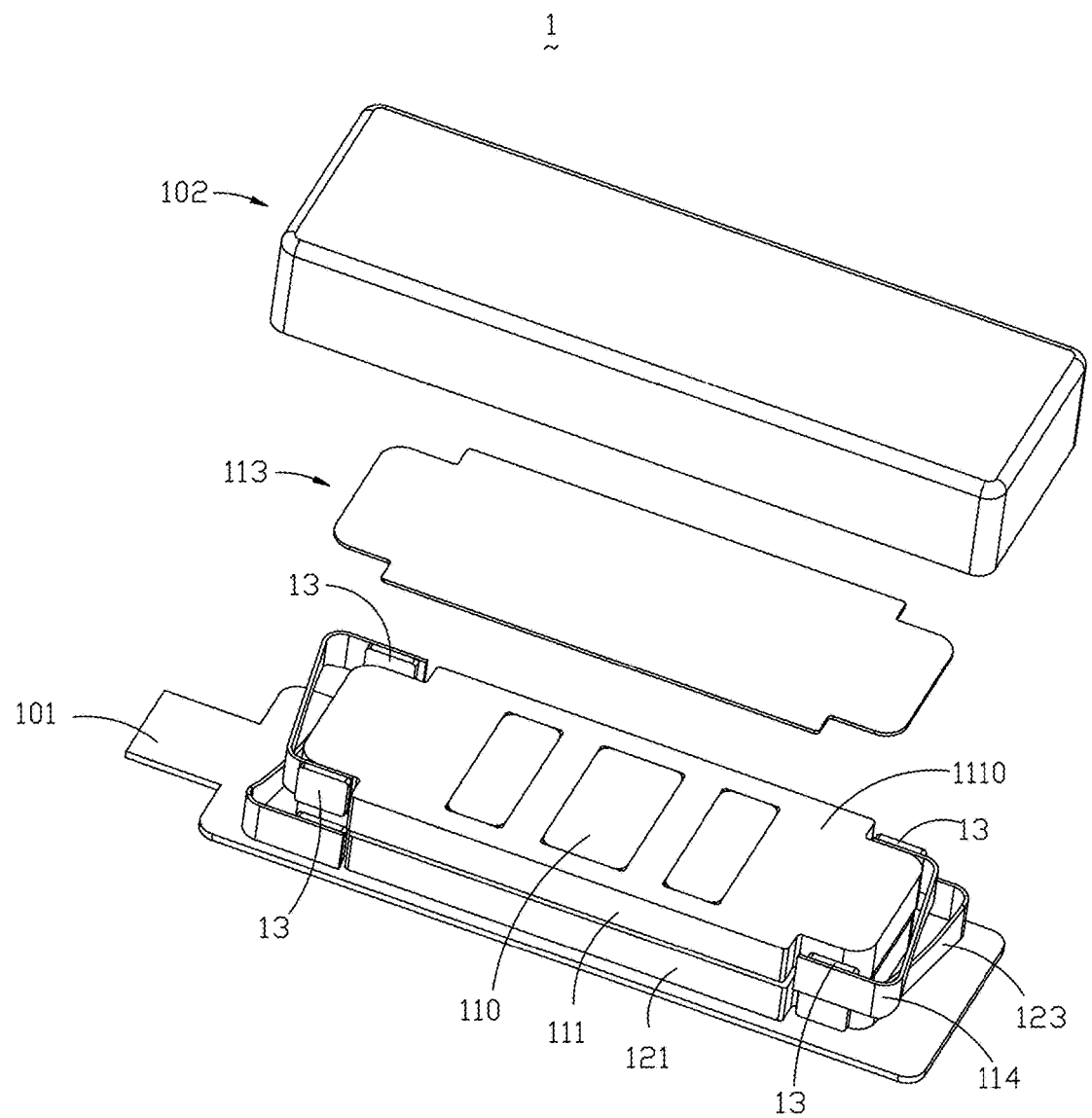
FIG. 3 is a partly assembled view of the vibration motor of FIG. 1.

Furthermore, in order to enhance bonding strength between the first elastic connectors 114 and the second elastic connectors 123, soldering pads 13 may be provided at soldering positions of the first elastic connectors 114 and the second elastic connectors, as shown in FIG. 3.

The housing 10 includes a base 101 and a cover 102. The cover 102 covers the base 101 to form the accommodating space 100. The base 101 is a bottom plate in the present embodiment, and the cover 102 has a cap-shaped configuration with a plurality of sidewalls in the present embodiments. The first elastic connectors 114 and the second elastic connectors 123 are both connected to two opposite sidewalls of the cover 102.

In the vibration motor 1 as provided in the present disclosure, the first vibration system 11 and the second vibration system 12 cooperate to form a double resonance system, and thus the vibration motor 1 is enabled to have two different resonant frequencies, and is applicable to a mobile device having double resonance requirement. Since the vibration motor 1 can provide two different resonant frequencies in a single motor configuration, it is unnecessary to employ two independent vibration motors in the mobile device; this can also meet the miniaturization requirement of the mobile device.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor, comprising:
  a housing providing an accommodating space;
  a first vibration system and a second vibration system being elastically suspended within the accommodating space;
  wherein the first vibration system comprises a permanent magnet, and the second vibration system comprises a coil assembly opposite to the permanent magnet; the coil assembly is configured for generating a magnetic field, the magnetic field interacts with the permanent magnet to drive the first vibration system and the second vibration system to vibrate in the housing.

2. The vibration motor of claim 1, wherein an intrinsic resonant frequency of the first vibration system is different from that of the second vibration system.

3. The vibration motor of claim 2, wherein the first vibration system further comprises a first mass block, and the permanent magnet is received in the first mass block.

4. The vibration motor of claim 3, wherein the permanent magnet comprises a first permanent magnet unit, a second permanent magnet unit and a third permanent magnet unit; the first mass block comprises a first receiving hole, a second receiving hole and a third receiving hole; the first permanent magnet unit, the second permanent magnet unit and the third permanent magnet unit are respectively received in the first receiving hole, the second receiving hole and the third receiving hole.

5. The vibration motor of claim 4, wherein the first receiving hole, the second receiving hole and the third receiving hole are arranged in parallel along a vibration direction of the first vibration system, and are spaced apart from each other.

6. The vibration motor of claim 3, wherein the second vibration system comprises a second mass block, the second mass block comprises an accommodating groove for accommodating the magnetic force generation part.

7. The vibration motor of claim 6, wherein the accommodating groove is recessed perpendicular to the vibration direction of the first vibration system.

8. The vibration motor of claim 6, wherein the first vibration system further comprises a pair of first elastic connectors, the pair of first elastic connectors is configured for elastically connecting two opposite ends of the first mass block with the housing.

9. The vibration motor of claim 8, wherein the second vibration system further comprises a pair of second elastic connectors, the pair of second elastic connectors is configured for elastically connecting two opposite ends of the second mass block with the housing.

10. The vibration motor of claim 9, wherein the first elastic connectors and the second elastic connectors are both U-shaped elastic connecting members.

11. The vibration motor of claim 4, wherein the first vibration system further comprises a magnetic plate attached to an upper surface of the first mass block, and the magnetic plate covers the first permanent magnet unit, the second permanent magnet unit and the third permanent magnet unit.

12. The vibration motor of claim 6, wherein the coil assembly comprising a first coil and a second coil, the first coil and the second coil are received in the accommodating groove of the second mass block in parallel.

13. The vibration motor of claim 12, wherein the first coil is placed under the first permanent magnet unit and a first portion of the second permanent magnet unit; the second coil is placed under a second portion of the second permanent magnet unit and the third permanent magnet unit.

14. The vibration motor of claim 13, wherein the first coil and the second coil are both flat ring-shaped coils.

15. The vibration motor of claim 1, wherein the housing comprises a base and a cover, the cover covers the base to form the accommodating space.

\* \* \* \* \*